United States Patent
Park et al.

(10) Patent No.: US 8,400,982 B2
(45) Date of Patent: Mar. 19, 2013

(54) METHOD FOR HANDLING CORRECTLY RECEIVED BUT HEADER COMPRESSION FAILED PACKETS

(75) Inventors: Sung Jun Park, Gyeonggi-do (KR); Young Dae Lee, Gyeonggi-do (KR); Seung June Yi, Gyeonggi-do (KR); Sung Duck Chun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 289 days.

(21) Appl. No.: 12/669,137

(22) PCT Filed: Sep. 11, 2008

(86) PCT No.: PCT/KR2008/005392
§ 371 (c)(1),
(2), (4) Date: Jan. 14, 2010

(87) PCT Pub. No.: WO2009/038312
PCT Pub. Date: Mar. 26, 2009

(65) Prior Publication Data
US 2010/0195617 A1  Aug. 5, 2010

Related U.S. Application Data

(60) Provisional application No. 60/974,072, filed on Sep. 20, 2007.

(30) Foreign Application Priority Data

Sep. 11, 2008  (KR) .................. 10-2008-0089809

(51) Int. Cl.
*H04W 4/00* (2009.01)
(52) U.S. Cl. ..................................... 370/331
(58) Field of Classification Search .................. None
See application file for complete search history.

(56) References Cited

U.S. PATENT DOCUMENTS

| | | | |
|---|---|---|---|
| 6,157,833 A | 12/2000 | Lawson-Jenkins et al. |
| 6,324,171 B1 | 11/2001 | Lee et al. |
| 6,353,628 B1 | 3/2002 | Wallace et al. |
| 6,526,027 B1 | 2/2003 | Yeom |
| 6,567,409 B1 | 5/2003 | Tozaki et al. |
| 6,725,267 B1 | 4/2004 | Hoang |

(Continued)

FOREIGN PATENT DOCUMENTS

| | | |
|---|---|---|
| EP | 1148753 | 10/2001 |
| EP | 1168877 | 1/2002 |

(Continued)

OTHER PUBLICATIONS

Nokia; "Requirements for Redirection in E-UTRAN"; 3GPP TSG-RAN WG2 Meeting #56-bis; Jan. 2007; Sorrento, Italy; R2-070107.

(Continued)

*Primary Examiner* — Jung-Jen Liu
(74) *Attorney, Agent, or Firm* — Lee, Hong, Degerman, Kang & Waimey

(57) ABSTRACT

A data processing method for a mobile communication system is provided. In a method in which a source base station processes data in a mobile communication system, a first data block including a full header and at least one second data block on which header compression was performed based on the first data block are transmitted to a user equipment and the first data block and the at least one second data block are then forwarded to a target base station during a handover procedure when the first data block was not correctly received and one or more of the at least one second data block was correctly received by the user equipment.

7 Claims, 10 Drawing Sheets

U.S. PATENT DOCUMENTS

| | | | |
|---|---|---|---|
| 7,197,317 B2 | 3/2007 | Parkvall et al. | |
| 7,551,643 B2 | 6/2009 | Yeo et al. | |
| 7,769,351 B2* | 8/2010 | Kwak et al. | 455/69 |
| 2001/0044322 A1 | 11/2001 | Raaf | |
| 2002/0024972 A1 | 2/2002 | Yi et al. | |
| 2002/0059464 A1* | 5/2002 | Hata et al. | 709/247 |
| 2002/0091860 A1* | 7/2002 | Kalliokulju et al. | 709/247 |
| 2003/0007490 A1* | 1/2003 | Yi et al. | 370/394 |
| 2003/0007512 A1 | 1/2003 | Tourunen et al. | |
| 2003/0123485 A1* | 7/2003 | Yi et al. | 370/477 |
| 2003/0165122 A1* | 9/2003 | Westphal | 370/329 |
| 2003/0165133 A1 | 9/2003 | Garani | |
| 2003/0189922 A1 | 10/2003 | Howe | |
| 2003/0207696 A1 | 11/2003 | Willenegger et al. | |
| 2004/0014452 A1 | 1/2004 | Lim et al. | |
| 2004/0028078 A1 | 2/2004 | Beckmann et al. | |
| 2004/0039830 A1* | 2/2004 | Zhang et al. | 709/230 |
| 2004/0042507 A1* | 3/2004 | Pelletier et al. | 370/521 |
| 2004/0117860 A1 | 6/2004 | Yi et al. | |
| 2004/0121771 A1 | 6/2004 | Song et al. | |
| 2004/0148427 A1* | 7/2004 | Nakhjiri et al. | 709/237 |
| 2004/0253959 A1 | 12/2004 | Hwang et al. | |
| 2005/0041610 A1 | 2/2005 | Lee et al. | |
| 2005/0041681 A1 | 2/2005 | Lee et al. | |
| 2005/0094670 A1 | 5/2005 | Kim | |
| 2005/0141462 A1 | 6/2005 | Aerrabotu et al. | |
| 2005/0160184 A1* | 7/2005 | Walsh et al. | 709/247 |
| 2005/0176474 A1 | 8/2005 | Lee et al. | |
| 2005/0185620 A1 | 8/2005 | Lee et al. | |
| 2005/0238051 A1 | 10/2005 | Yi et al. | |
| 2005/0286470 A1* | 12/2005 | Asthana et al. | 370/331 |
| 2006/0067364 A1 | 3/2006 | Jung et al. | |
| 2006/0087994 A1 | 4/2006 | Barth et al. | |
| 2006/0126554 A1 | 6/2006 | Motegi et al. | |
| 2006/0165045 A1 | 7/2006 | Kim et al. | |
| 2006/0187846 A1* | 8/2006 | Pelletier et al. | 370/252 |
| 2006/0245417 A1 | 11/2006 | Conner et al. | |
| 2007/0060139 A1 | 3/2007 | Kim et al. | |
| 2007/0155389 A1* | 7/2007 | Zhang | 455/445 |
| 2007/0165567 A1 | 7/2007 | Tan et al. | |
| 2007/0165635 A1* | 7/2007 | Zhang et al. | 370/390 |
| 2007/0177569 A1 | 8/2007 | Lundby | |
| 2007/0206531 A1 | 9/2007 | Pajukoski et al. | |
| 2007/0248075 A1 | 10/2007 | Liu et al. | |
| 2007/0291728 A1 | 12/2007 | Dalsgaard et al. | |
| 2007/0291729 A1 | 12/2007 | Dalsgaard et al. | |
| 2008/0004058 A1 | 1/2008 | Jeong et al. | |
| 2008/0056273 A1 | 3/2008 | Pelletier et al. | |
| 2008/0101268 A1 | 5/2008 | Sammour et al. | |
| 2008/0167089 A1 | 7/2008 | Suzuki et al. | |
| 2008/0181127 A1 | 7/2008 | Terry et al. | |
| 2008/0188223 A1* | 8/2008 | Vesterinen et al. | 455/436 |
| 2008/0240439 A1* | 10/2008 | Mukherjee et al. | 380/272 |
| 2008/0285691 A1 | 11/2008 | Onggosanusi et al. | |
| 2008/0316959 A1 | 12/2008 | Bachl et al. | |
| 2009/0022107 A1* | 1/2009 | Kapoor et al. | 370/331 |
| 2009/0040982 A1* | 2/2009 | Ho et al. | 370/331 |
| 2009/0124259 A1* | 5/2009 | Attar et al. | 455/436 |
| 2010/0067495 A1 | 3/2010 | Lee et al. | |
| 2010/0238799 A1* | 9/2010 | Sebire | 370/225 |
| 2010/0254340 A1 | 10/2010 | Park et al. | |
| 2010/0265896 A1 | 10/2010 | Park et al. | |

FOREIGN PATENT DOCUMENTS

| | | | |
|---|---|---|---|
| EP | 1209938 | 5/2002 | |
| EP | 1304898 | 4/2003 | |
| EP | 1315356 | 5/2003 | |
| EP | 1318632 | 6/2003 | |
| EP | 1337124 | 8/2003 | |
| EP | 1372310 | 12/2003 | |
| EP | 1420551 | 5/2004 | |
| EP | 1501328 | 1/2005 | |
| EP | 1511245 | 3/2005 | |
| EP | 1720322 | 11/2006 | |
| EP | 1720373 | 11/2006 | |
| JP | 2002539686 | 11/2002 | |
| JP | 2003504935 | 2/2003 | |
| JP | 2005354488 | 12/2005 | |
| JP | 2006505979 | 2/2006 | |
| JP | 2006067115 | 3/2006 | |
| JP | 2007165635 A | * 6/2007 | |
| KR | 1020010105240 | 11/2001 | |
| KR | 1020040039944 | 11/2002 | |
| KR | 1020050008440 | 10/2003 | |
| KR | 1020050096763 | 3/2004 | |
| KR | 1020040048675 | 6/2004 | |
| KR | 1020050027972 | 3/2005 | |
| WO | 0074416 | 12/2000 | |
| WO | 2004043094 | 5/2004 | |
| WO | 2004064272 | 7/2004 | |
| WO | 2005048613 | 5/2005 | |
| WO | 2006/075820 | 7/2006 | |
| WO | 2006104344 | 10/2006 | |
| WO | 2006109851 | 10/2006 | |
| WO | 2007005288 | 5/2007 | |
| WO | 2007-078929 | 7/2007 | |
| WO | 2007078155 | 7/2007 | |
| WO | 2007078172 | 7/2007 | |
| WO | 2007133034 | 11/2007 | |

OTHER PUBLICATIONS

Panasonic; "MAC PDU Format for LTE"; 3GPP TSG RAN WG2 #56-bis; Jan. 2007; Sorrento, Italy; R2-070096.

LG Electronics, Inc.; "Relative Buffer Status Reporting"; 3GPP TSG-RAN WG2 meeting #46-bis; Apr. 2005; Beijing, China; R2-050852.

IPWireless; "Layer 2 Functions LTE"; 3GPP TSG RAN WG2 #48-bis; Oct. 2005; Cannes, France; Tdoc R2-052377.

Samsumg; "Selective Forwarding/Retransmission During HO" 3GPP TSG-RAN2 Meeting #56-bis; Jan. 2007; Sorrento, Italy; Tdoc R2-070130.

Samsung; "Re-Use of PDCP SN at ARQ Level?"; 3GPP TSG-RAN2 Meeting #53-bis; Jun. 2006; Cannes, France; Tdoc R2-061829.

LG Electronics Inc., "Contents of PDCP Status Report," R2-07xxxx, 3GPP TSG-RAN WG2 #59, Oct. 2007, XP-002580785.

LG Electronics Inc., "PDCP Retransmissions," R2-073041, 3GPP TSG-RAN WG2 #59, Aug. 2007, XP-050135778.

LG Electronics Inc., "PDCP Structure and Traffic Path," R2-073259, 3GPP TSG-RAN WG2 #59, Aug. 2007, XP-050135985.

Alcatel-Lucent, "DL Control Signaling and Multiplexing for VOIP," R1-071721, 3GPP TSG RAN WG1 Meeting #48bis, Mar. 2007,XP-002460800.

Nokia Corporation et al., "MAC Header Format," R2-073891, 3GPP TSG-RAN WG2 Meeting #59bis, Oct. 2007, XP-002602993.

LG Electronics Inc., "Support for VoIP Over MAC-HS/EHS," R2-071542, 3GPP TSG-RAN WG2 #57bis, Mar. 2007, XP-050134474.

Sammour, M.; "Method and Ystem Enhancing Discontinuous Reception in Wireless Systems"; U.S. Appl. No. 60/863,185; Oct. 27, 2005.

NTT DoCoMo, Inc., "MAC PDU Structure for LTE," 3GPP TSG RAN WG2 #56bis, R2-070280, Jan. 2007, XP-050133369.

Catt et al., "Enhancement to Buffer Status Reporting," 3GPP TSG-RAN WG2 #57bis, R2-071345, Mar. 2007, XP-050134291.

LG Electronics Inc., "UL Timing Control Related to Contention Resolution," R2-081607, 3GPP TSG RAN WG2 #61bis, Mar. 2008, XP-050139334.

3rd Generation Partnership Project (3GPP), "Technical Specification Group Radio Access Network; Evolved Universal Terrestrial Radio Access (E-UTRA) Medium Access Control (MAC) Protocol Specification (Release 8)," 3GPP TS 36.321, v8.1.0, Mar. 2008, XP-050377617.

Gao, Y., et al., "Research on the Access Network and MAC Technique for Beyond 3G Systems," IEEE Wireless Communications, vol. 14, No. 2, pp. 57-61, Apr. 2007.

3rd Generation Partnership Project (3GPP), "Medium Access Control (MAC) Protocol Specification," Technical Specification, 3GPP TS 25.321, V.7.4.0, Mar. 2007, XP-050367709.

ASUSTeK, "Granularity Consideration for Variable RLC PDU Sizes," R2-070336, 3GPP TSG-RAN WG2 Meeting #56bis, Jan. 15, 2007, XP-050133423.

Bosch, "Header Compression Signaling," TSGR2#9(99)i32, TSG-RAN Working Group 2 (Radio Layer 2 and Radio Layer 3), Nov. 29, 1999, XP-050114120.

3rd Generation Partnership Project (3GPP), "Packet Data Convergence Protocol (PDCP) Specification," Technical Specification, 3GPP TS 25.323, V.7.4.0, Mar. 2007, XP-050367856.

* cited by examiner

METHOD FOR HANDLING CORRECTLY RECEIVED BUT HEADER COMPRESSION FAILED PACKETS

CROSS-REFERENCE TO RELATED APPLICATIONS

This application is the National Stage filing under 35 U.S.C. §371 of International Application No. PCT/KR2008/005392, filed on Sep. 11, 2008, which claims the benefit of earlier filing date and right of priority to Korean Application No. 10-2008-0089809, filed on Sep. 11, 2008, and also claims the benefit of U.S. Provisional Application Ser. No. 60/974,072, filed on Sep. 20, 2007.

TECHNICAL FIELD

The present invention relates to a mobile communication system, and more particularly, to a data processing method in a mobile communication system.

BACKGROUND ART

The mobile communication system is different from a wired communication system in that terminals constantly move. Accordingly, mobility of terminals should be taken into consideration when designing the mobile communication system and providing services through the system. That is, the mobile communication system needs to support the movement of a terminal from one region to another. When a terminal is moving away from a currently connected base station while approaching another base station, the network needs to switch a connection point of the terminal from the current base station to the other base station.

On the other hand, all user data should be transmitted within a limited time. In the case of a voice call, one voice signal needs to be sent from a user who speaks to another user who listens within a predetermined time. Otherwise, the call satisfaction of the listening user is reduced and it is difficult for them to converse normally. Also, Transmission Control Protocol (TCP) data needs to arrive at the receiving side within a predetermined time and the receiving side needs to acknowledge receipt of the data to the transmitting side within a predetermined time. Otherwise, the transmitting side will retransmit the TCP data, thereby wasting network resources. Accordingly, the mobile communication system needs to operate so that user data is transmitted within a predetermined time.

The mobile communication system also needs to reduce data loss in a radio interface as much as possible. For example, if one TCP packet is lost due to lower entities during transfer of the TCP packet, a TCP application determines that a congestion has occurred in the network and rapidly reduces the transmission rate of TCP packets. For example, when a packet loss occurs during a TCP application exchanges data at a rate of 100 Mbps, the TCP application may reduce the data transmission rate to almost 0 Mbps. This will rapidly reduce quality that the user experiences and make data transmission unstable. In the mobile communication system, the transmitting side retransmits data to minimize data loss when an ACK has not been received within a predetermined time or a NACK has been received for the data.

DISCLOSURE OF THE INVENTION

Technical Problem

To retransmit a data block that has not been correctly (or successfully) transmitted upon handover, conventional methods determine whether or not the data block has been correctly transmitted based only on a RLC status report. However, when a data block has been compressed through header compression, header decompression of the data block may fail at a PDCP layer above the RLC layer even if the data block has been correctly transmitted at the RLC layer. However, a PDCP layer of the transmitting side determines whether or not the data block has been received by the PDCP layer of the receiving side based on a RLC status report of the data block and performs retransmission after handover. Accordingly, a data block, header decompression of which has failed although the data block has been correctly received by the RLC layer, may be lost during the handover procedure.

An object of the present invention devised to solve the problem lies in providing a data processing method that prevents loss of a specific data block in a retransmission procedure when handover has occurred.

Another object of the present invention devised to solve the problem lies in providing a data processing method that prevents loss of the data block even if header decompression has failed upon handover.

A further object of the present invention devised to solve the problem lies in providing a data processing method in which header compression results are taken into consideration when determining whether or not a data block has been correctly transmitted upon handover.

A still further object of the present invention devised to solve the problem lies in providing a data processing method in which a data block, header decompression of which has failed upon handover, is retransmitted after handover.

Objects of the present invention are not limited to those described above and other objects will be clearly understood by those skilled in the art from the following description.

Technical Solution

In an aspect of the present invention, provided herein is a method of processing data by a source base station in a mobile communication system, the method including the steps of transmitting a first data block including a full header and at least one second data block on which header compression was performed based on the first data block to a user equipment, and forwarding the first data block and the at least one second data block to a target base station during a handover procedure when the first data block was not correctly received and one or more of the at least one second data block was correctly received by the user equipment.

In another aspect of the present invention, provided herein is a method of transmitting data by a user equipment in a mobile communication system, the method including the steps of transmitting a first data block including a full header and at least one second data block on which header compression was performed based on the first data block to a source base station, and retransmitting the first data block and the at least one second data block to a target base station after handover when the first data block was not correctly received and one or more of the at least one second data block was correctly received by the source base station.

In a further aspect of the present invention, provided herein is a method of transmitting and receiving data by a user equipment in a mobile communication system, the method including the steps of receiving a first data block including a full header and at least one second data block on which header compression was performed based on the first data block from a source base station, transmitting a negative acknowledgement for the first data block and a positive acknowledgement for the at least one second data block to the source base station, and re-receiving the first data block and the at least one second data block from a target base station after handover.

Advantageous Effects

Embodiments of the present invention have the following advantages.

First, a terminal or base station can prevent loss of a specific data block in a retransmission procedure when handover has occurred.

Second, a terminal or base station can prevent loss of a data block even if header decompression has failed upon handover.

Third, a terminal or base station can take into consideration header compression results when determining whether or not a data block has been correctly transmitted upon handover.

Fourth, a terminal or base station can retransmit, after handover, a data block, header decompression of which has failed upon handover.

Advantages of the present invention are not limited to those described above and other advantages will be clearly understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Mode for Invention

The above and other configurations, operations, and features of the present invention will be easily understood from the embodiments of the invention described below with reference to the accompanying drawings. The embodiments described below are examples wherein technical features of the invention are applied to an Evolved Universal Mobile Telecommunications System (E-UMTS).

Figure 1:
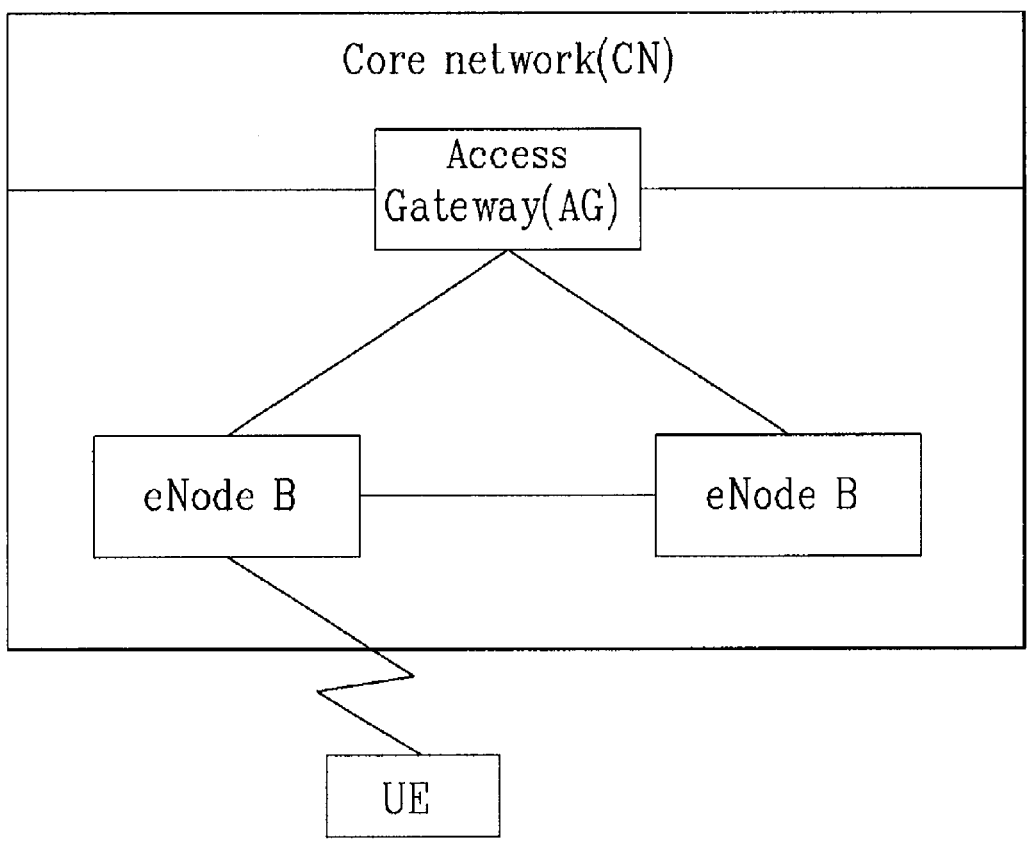
FIG. 1 shows a network structure of an E-UMTS.

FIG. 1 shows a network structure of the E-UMTS to which an embodiment of the present invention is applied. The E-UMTS system is an evolved version of the conventional WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

As shown in FIG. 1, the E-UMTS mainly includes a User Equipment (UE), a base station (or eNB or eNode B), and an Access Gateway (AG) which is located at an end of a network (E-UTRAN) and which is connected to an external network. Generally, an eNB can simultaneously transmit multiple data streams for a broadcast service, a multicast service and/or a unicast service. The AG can be divided into a part that handles processing of user traffic and a part that handles control traffic. Here, the AG part for processing new user traffic and the AG part for processing control traffic can communicate with each other using a new interface. One or more cells may exist for one eNB. An interface for transmitting user traffic or control traffic can be used between eNBs. A Core Network (CN) may include the AG and a network node or the like for user registration of the UE. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
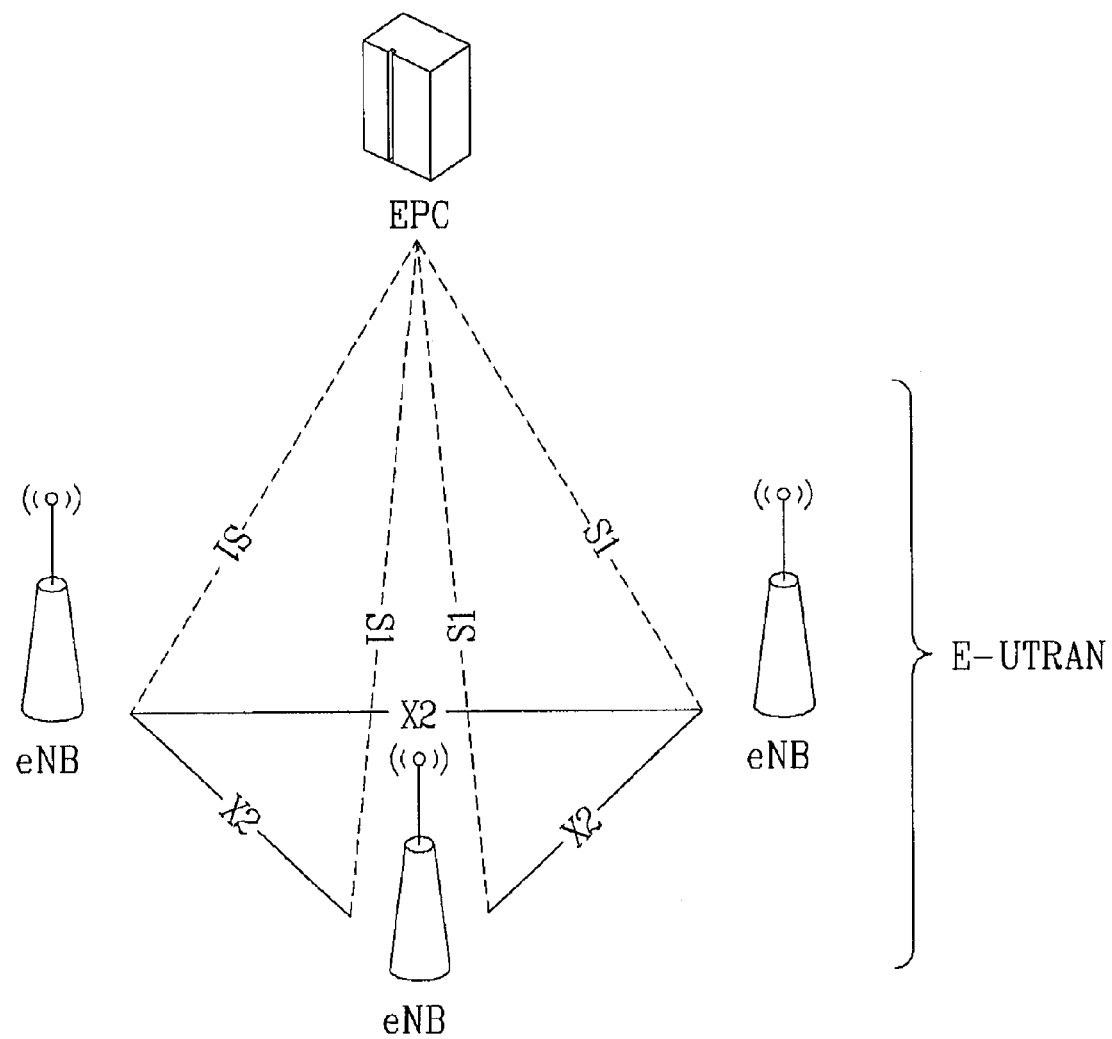
FIG. 2 illustrates a schematic structure of an Evolved Universal Terrestrial Radio Access Network (E-UTRAN).

FIG. 2 illustrates a network structure of an Evolved Universal Terrestrial Radio Access Network (E-UTRAN) system which is a mobile communication system to which the embodiment of the present invention is applied. The E-UTRAN system is an evolved version of the conventional UTRAN system. The E-UTRAN includes a base station that will also be referred to as "eNode B" or "eNB". The eNBs are connected through an X2 interface. Each eNB is connected to the User Equipment (UE) through a radio interface and is connected to an Evolved Packet Core (EPC) through a S1 interface.

Figure 3A:
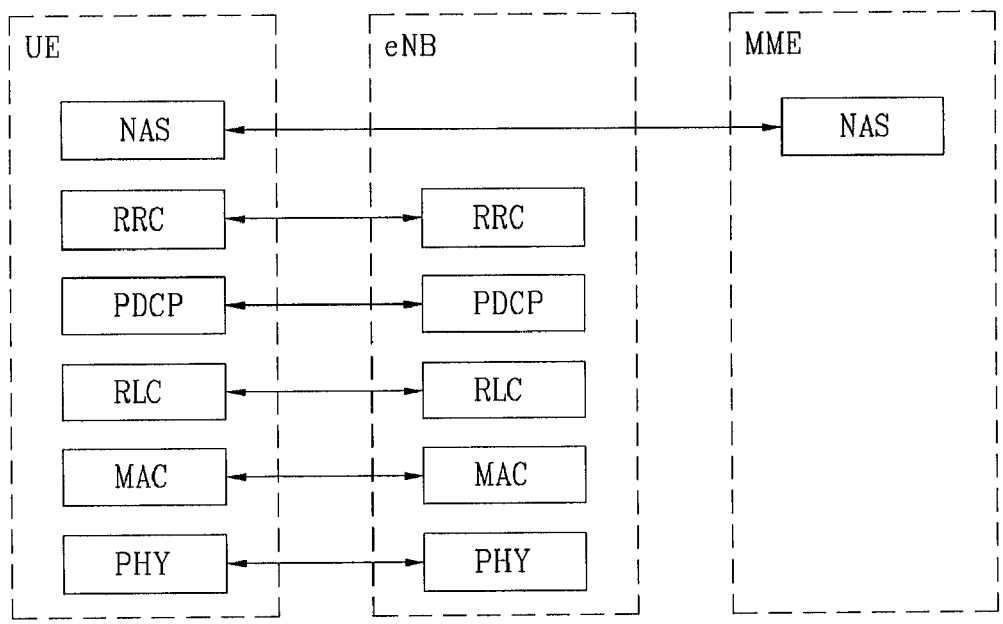
FIGS. 3A and 3B illustrate the configurations of a control plane and a user plane of a radio interface protocol between a UE and an E-UTRAN.
Figure 3B:
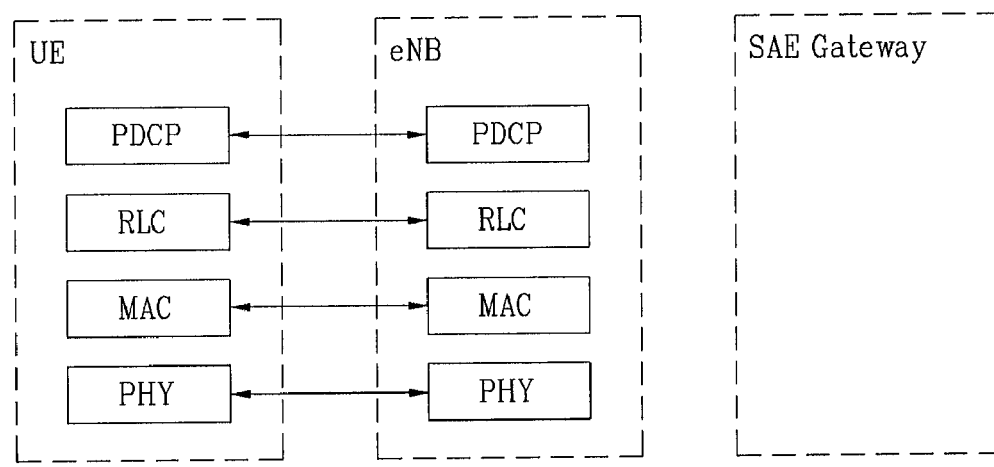

FIGS. 3A and 3B illustrate the configurations of a control plane and a user plane of a radio interface protocol between a UE and a UMTS Terrestrial Radio Access Network (UTRAN) based on the 3GPP radio access network standard. The radio interface protocol is divided horizontally into a physical layer, a data link layer and a network layer, and vertically into a user plane for data transmission and a control plane for signaling. The protocol layers of FIGS. 3A and 3B can be divided into a L1 layer (first layer), a L2 layer (second layer) and a L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports data transmission with reliability. The functions of the RLC layer may also be implemented through internal functional blocks of the MAC layer. In this case, the RLC layer need not be existed. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the lowermost of the third layer is defined only in the control plane and is responsible for control of logical, transport, and physical channels in association with configuration, re-configuration and release of Radio Bearers (RBs). The RB is a service that the second layer provides for data communication between the UE and the UTRAN. To accomplish this, the RRC layer of the UE and the RRC layer of the network exchange RRC messages. The UE is in RRC connected mode if RRC connection has been established between the RRC layer of the radio network and the RRC layer of the UE. Otherwise, the UE is in RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 4:
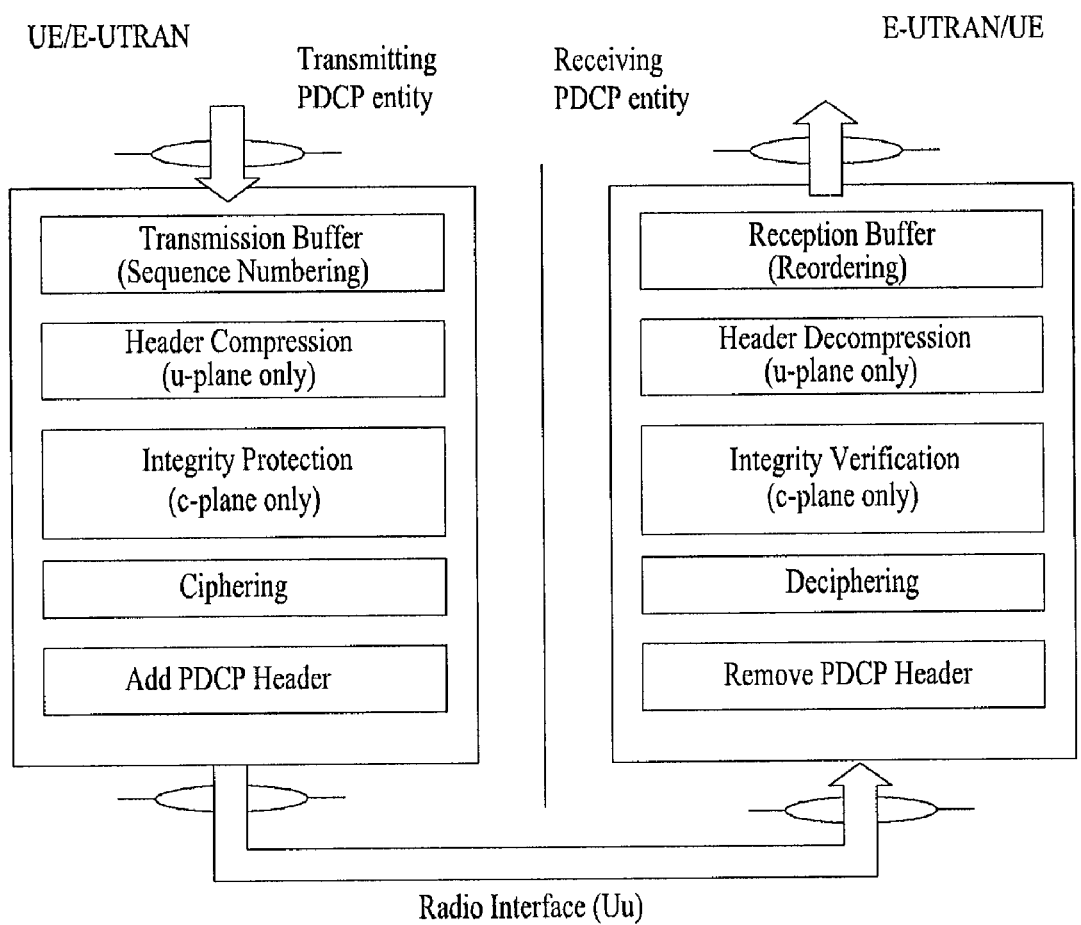
FIG. 4 illustrates the functional structure of a PDCP layer.

FIG. 4 illustrates the functions of PDCP layers of transmitting and receiving sides. The structure of the transmitting side located at the left side in FIG. 4 shows processes applied to a PDCP SDU when the PDCP layer has received the PDCP SDU from an upper entity. The structure of the receiving side located at the right side in FIG. 4 shows processes applied to a PDCP PDU when the PDCP layer has received the PDCP PDU from a lower entity.

The PDCP entity is used for both the user plane and the control plane and some functions of the PDCP entity are selectively applied depending on which plane is used. That is, a header compression function is applied only to user plane data and an integrity protection function is applied only to control plane data.

The PDCP layer of the transmitting side performs data processing in the following procedure.

1. The PDCP layer of the transmitting side receives and stores PDCP SDUs in a transmission buffer and allocates a sequence number to each PDCP SDU.
2. The PDCP layer performs header compression on the PDCP SDU if a user plane Radio Bearer (RB) has been established (or configured).
3. The PDCP layer performs integrity protection on the PDCP SDU if a control plane Radio Bearer (RB) has been established.
4. The PDCP layer ciphers a data block generated through the above processes 2 and 3.
5. The PDCP layer attaches an appropriate header to the ciphered data block to construct a PDCP PDU and transfers the PDCP PDU to the RLC layer.

The PDCP layer of the receiving side performs data processing in the following procedure.

1. The PDCP layer of the receiving side removes a header from a received PDCP PDU.
2. The PDCP layer deciphers the PDCP PDU from which the header has been removed.
3. The PDCP layer performs header decompression on the deciphered PDCP PDU if a user plane RB has been established.
4. The PDCP layer performs integrity verification on the deciphered PDCP PDU if a control plane RB has been established.
5. The PDCP layer transfers each data block (i.e., PDCP SDU) that has subjected to the above processes 3 and 4 to an upper layer. If a user plane RB has been established, the PDCP layer transfers each data block to the upper layer after storing and reordering the data block in a reception buffer as needed.

Figure 5:
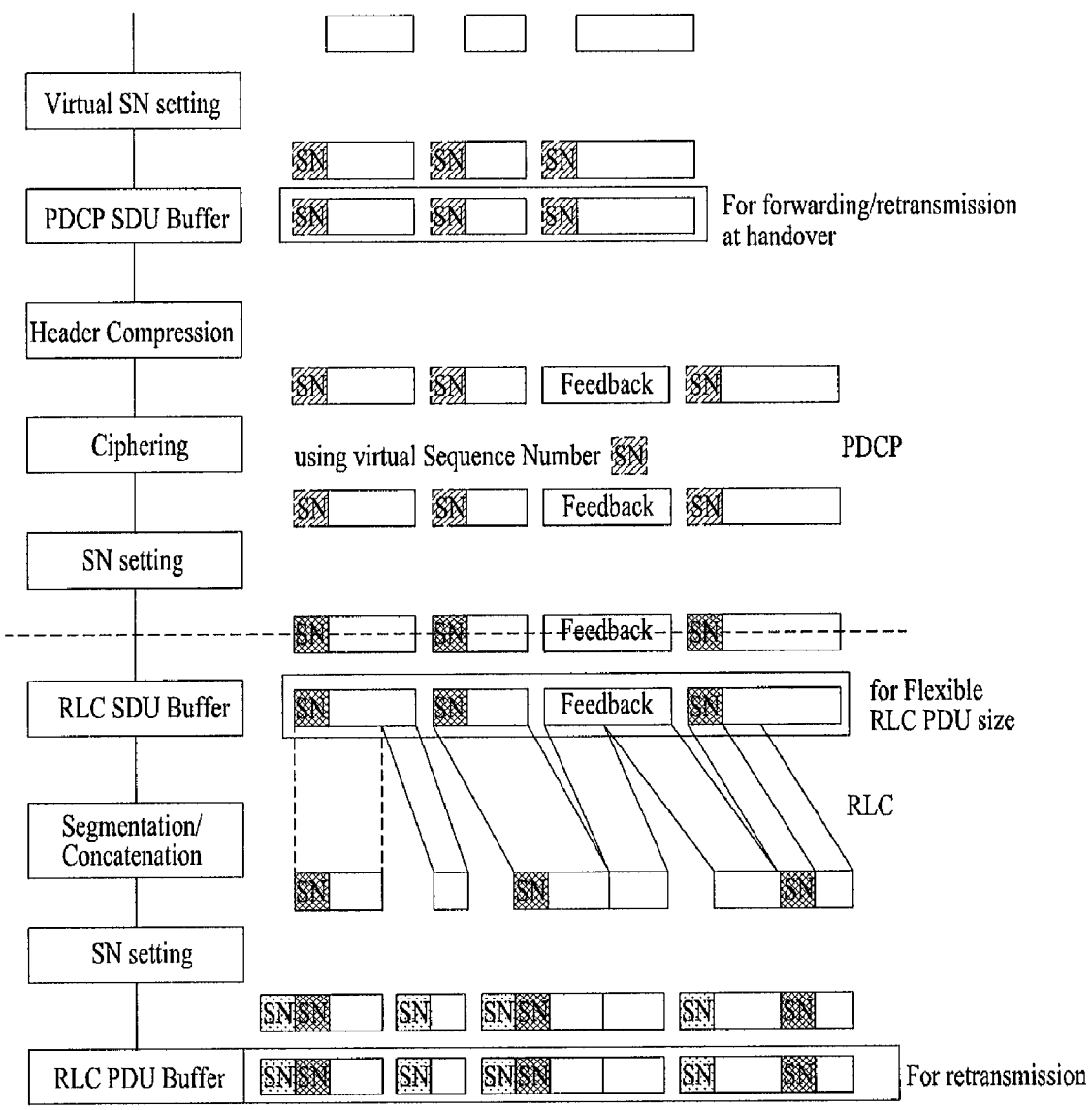
FIG. 5 illustrates a method for processing data a PDCP layer and an AM RLC layer of the transmitting side.

FIG. 5 illustrates a data processing method for a PDCP layer and an AM RLC layer of the transmitting side.

An AM RLC layer of the LTE receives data from an upper PDCP layer. The data processing method for the PDCP layer is the same as described above with reference to FIG. 4. The data processing method for the AM RLC layer is as follows.

1. The AM RLC layer receives an RLC SDU (i.e., a PDCP PDU) from the PDCP layer above the AM RLC layer and stores the received RLC SDU in a RLC SDU buffer. This supports flexible RLC PDU size.
2. The AM RLC layer have stored RLC SDUs in the RLC SDU buffer. And the AM RLC segments or concatenates a necessary amount of RLC SDUs according to the requested size when a MAC layer below the AM RLC layer requests a transmission every transmission time interval.
3. The AM RLC layer sequentially attaches a RLC Sequence Number (SN) to the segmented or concatenated data blocks to construct a RLC PDU.
4. The AM RLC layer then stores the constructed RLC PDU in an RLC PDU buffer for retransmission that may be needed in the future.

The AM RLC layer of the transmitting side performs retransmission according to a RLC status report received from the receiving side. Through the RLC status report, the receiving AM RLC layer (i.e., the AM RLC layer of the receiving side) notifies the transmitting AM RLC layer (i.e., the AM RLC layer of the transmitting side) of a reception state of each RLC PDU. The RLC status report provides Acknowledgement (ACK) information for a correctly (or successfully) received RLC PDU and provides Negative Acknowledgement (NACK) information for an uncorrectly received RLC PDU. Upon receiving the RLC status report, the transmitting AM RLC layer retransmits a negatively acknowledged RLC PDU. The AM RLC layer also finds a correctly transmitted RLC SDU based on positively acknowledged RLC PDU information and notifies the upper PDCP layer of the found RLC SDU. When the transmitting PDCP layer receives the information of the correctly transmitted RLC SDU (i.e., PDCP PDU) from the RLC layer, the PDCP layer can remove the corresponding PDCP SDU from the transmission buffer.

Retransmission of PDCP SDU Upon Handover

Reference will now be made to a procedure in which a transmitting PDCP layer retransmits a PDCP SDU that has been uncorrectly transmitted upon handover.

The transmitting PDCP layer stores PDCP SDUs in a transmission buffer received from the upper layer. Then, when handover has occurred, the transmitting PDCP layer retransmits a PDCP SDU that has not been received by the receiving PDCP layer after the handover. Here, the transmitting PDCP layer determines a PDCP SDU which the receiving PDCP layer has not received based on a status report from the RLC layer below the PDCP layer. When the transmitting RLC layer receives a RLC status report from the receiving RLC layer for each RLC PDU that the transmitting RLC layer has transmitted, the transmitting RLC layer finds a correctly transmitted RLC SDU based on positively acknowledged RLC PDU information and notifies the upper PDCP layer of the found RLC SDU. Therefore, the transmitting PDCP layer can determine whether each PDCP SDU has been correctly transmitted based on the notification information provided by the transmitting RLC layer. However, since the RLC status report is not always transmitted upon handover, latest information may not be provided to the transmitting PDCP layer. That is, for each RLC SDU that has been correctly transmitted after handover, the transmitting PDCP layer determines that the RLC SDU has been uncorrectly transmitted since it determines whether or not each RLC SDU has been correctly transmitted based on the last RLC status report before handover.

The transmitting PDCP layer retransmits each PDCP SDU that is determined to have been uncorrectly transmitted after handover to the receiving PDCP layer. However, upon handover, there would be a change of eNBs in charge of data transmission in the network (specifically, from a source eNB to a target eNB). Accordingly, in downlink transmission, the source eNB forwards each uncorrectly transmitted PDCP SDU to the target eNB so that the target eNB retransmits the PDCP SDU. On the other hand, in uplink transmission, the source eNB forwards each PDCP SDU, which is not in sequence although it was correctly received, to the target eNB so that the target eNB reorders the PDCP SDU.

Methods for retransmitting a PDCP SDU upon handover are different in downlink and uplink transmission as described above, and thus they are individually described below in detail.

Figure 6:
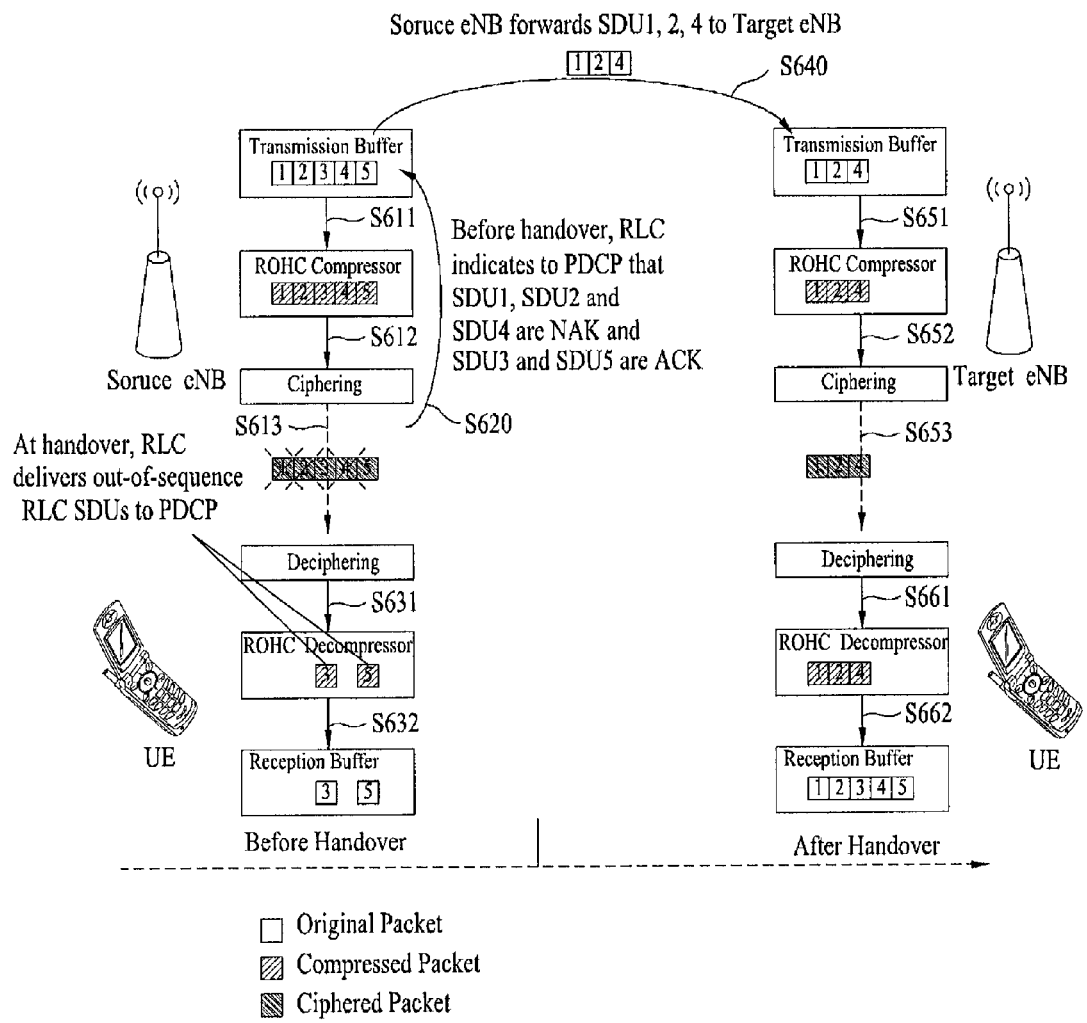
FIG. 6 illustrates a method for retransmitting PDCP SDUs when handover has occurred in downlink transmission.

FIG. 6 illustrates an example method in which PDCP SDUs that were uncorrectly transmitted upon handover are forwarded and retransmitted in downlink transmission. The following is a detailed procedure for retransmitting PDCP SDUs.

As shown in FIG. 6, the source eNB sequentially performs header compression and ciphering on PDCP SDUs 1 to 5 before handover and transmits the PDCP SDUs to a UE (S611 to S613). Here, the PDCP SDUs 1, 2 and 4 among the PDCP SDUs 1 to 5 are not correctly transmitted. Since the correctly transmitted PDCP SDUs 3 and 5 have not been sequentially received, the PDCP SDUs 3 and 5 are stored in a reception buffer of an AM RLC layer of the UE.

Before handover, the RLC layer of the UE transmits a RLC status report to the source eNB. The RLC layer of the source eNB notifies the PDCP layer that the SDUs 3 and 5 have been correctly transmitted (S620).

When handover has occurred, the receiving UE RLC layer transfers RLC SDUs to the PDCP layer even if the RLC SDUs are not sequential if they have been correctly received. The PDCP layer performs deciphering and header decompression on the RLC SDUs and then stores them in a reception buffer and prepares them for reordering (S631 and S632). PDCP SDUs stored in the reception buffer of the PDCP layer are transferred to the upper layer only when they are sequential and keep remaining in the reception buffer if they are not sequential.

When handover has occurred, the transmitting source eNB forwards PDCP SDUs, which have not been correctly transmitted, to the target eNB. In the example of FIG. 6, the SDUs 1, 2 and 4 are forwarded to the target eNB since they have not been correctly transmitted. The target eNB stores the SDUs forwarded from the source eNB and is then ready to transmit them (S640).

When handover has been completed, the target eNB starts transmitting SDUs again, beginning with the SDUs forwarded from the source eNB. New SDUs received from the upper layer are transmitted after the transmission of the SDUs forwarded from the source eNB is completed (S651 to S653).

After handover, the UE receives PDCP SDUs, which were not correctly received from the source eNB, from the target eNB. In the example of FIG. 6, when the UE receives the SDUs 1, 2, and 4 from the target eNB, the UE reorders the SDUs in the reception buffer and then sequentially transfers the SDUs 1 to 5 to the upper layer (S661 and S662).

Figure 7:
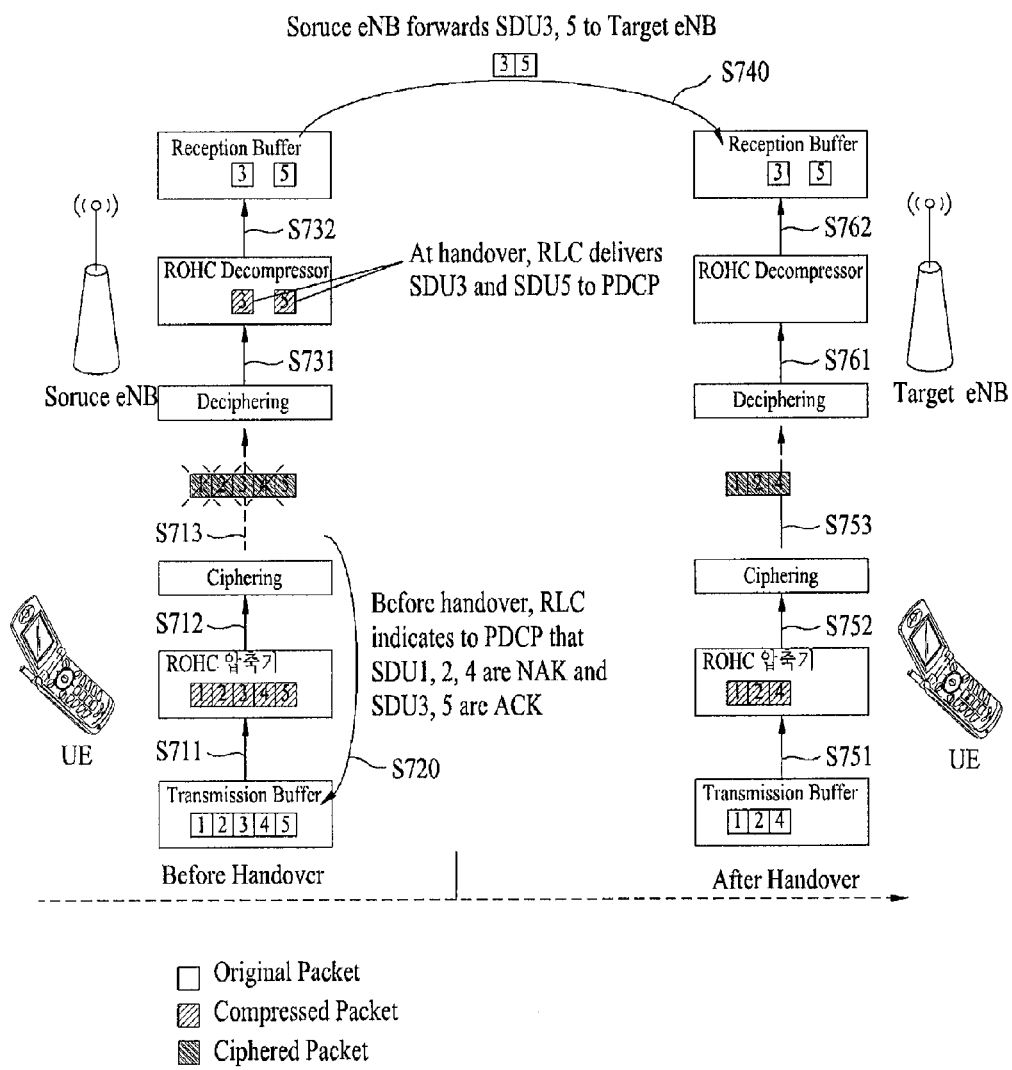
FIG. 7 illustrates a method for retransmitting PDCP SDUs when handover has occurred in uplink transmission.

FIG. 7 illustrates an example method in which a UE retransmits PDCP SDUs that were uncorrectly transmitted upon handover in uplink transmission. The following is a detailed procedure for retransmitting PDCP SDUs.

As shown in FIG. 7, the UE sequentially performs header compression and ciphering on PDCP SDUs 1 to 5 before handover and transmits the PDCP SDUs to the source eNB (S711 to S713). Here, the PDCP SDUs 1, 2 and 4 among the PDCP SDUs 1 to 5 are not correctly transmitted. Since the correctly transmitted PDCP SDUs 3 and 5 have not been sequentially received, the PDCP SDUs 3 and 5 are stored in a reception buffer of an AM RLC layer of the source eNB.

Before handover, the RLC layer of the source eNB transmits a RLC status report to the UE. The RLC layer of the UE notifies the PDCP layer that the SDUs 3 and 5 have been correctly transmitted (S720).

When handover has occurred, the RLC layer of source eNB which is a receiving side transfers RLC SDUs to the PDCP layer even if the RLC SDUs are not sequential if they have been correctly received. The PDCP layer performs deciphering and header decompression on the RLC SDUs and then stores them in a reception buffer (S731 and S732).

The source eNB forwards the PDCP PDUs 3 and 5 which have been stored in the reception buffer to the target eNB. When PDCP SDUs that were not sequentially received are forwarded from the source eNB to the target eNB, the target eNB stores the PDCP SDUs in the reception buffer and is then ready to reorder them. PDCP SDUs stored in the reception buffer of the PDCP layer are transferred to the upper layer only when they are sequential and keep remaining in the reception buffer if they are not sequential (740).

When handover has occurred, the UE which is a transmitting side is ready to retransmit PDCP SDUs, which have not been correctly transmitted to the source eNB, to the target eNB. In the example of FIG. 7, the UE which is a transmitting side is ready to retransmit the SDUs 1, 2 and 4 since they were not correctly transmitted.

When handover has been completed, the UE which is a transmitting side retransmits PDCP SDUs, which were not correctly transmitted to the source eNB, to the target eNB. In the example of FIG. 7, the UE which is a transmitting side retransmits the SDUs 1, 2, and 4 since they were not correctly transmitted. New SDUs received from the upper layer are transmitted after the retransmission of the SDUs is completed (S751 to S753).

After handover, the target eNB receives PDCP SDUs, which were not correctly received by the source eNB, from the UE. In the example of FIG. 7, when the target eNB receives the SDUs 1, 2, and 4 from the UE, the target eNB reorders the SDUs in the reception buffer and then sequentially transfers the SDUs 1 to 5 to the upper layer (S761 and S762).

Header Compression

Reference will now be made to header compression used in the PDCP layer. Header compression is a method for reducing a header size utilizing the fact that most parts of IP headers in IP packets belonging to the same packet stream are invariant. In this method, invariant fields are stored in a context format in a compressor of a transmitting side and a decompressor of a receiving side and only changed fields are transmitted after the context is created to reduce the overhead of an IP header. At an initial stage of header compression, there is no benefit from header compression since the compressor transmits full header packets to create a context for a corresponding packet stream in the decompressor. However, after the context is created in the decompressor, benefits of header compression are significant since only compressed headers are transmitted.

Robust Header Compression (ROHC), which is a typical header compression technique used in the LTE system, is used to reduce header information of a real-time packet such as a Real-time Transport Protocol (RTP)/User Datagram Protocol (UDP)/Internet Protocol (IP) packet. The RTP/UDP/IP packet is a data packet received from an upper layer to which RTP/UDP/IP-related headers are attached. A header of a RTP/UDP/IP packet includes a lot of various information required to transfer data to a destination through the Internet and then to reconstruct the data. Generally, the size of a header of a RTP/UDP/IP packet is 40 bytes in the case of IP version 4 (IPv4) and is 60 bytes in the case of IP version 6 (IPv6). When a header of a RTP/UDP/IP packet is compressed using ROHC, benefits of the header compression are significant since 40 or 60-byte header is reduced to 1 to 3-byte header.

Figure 8:
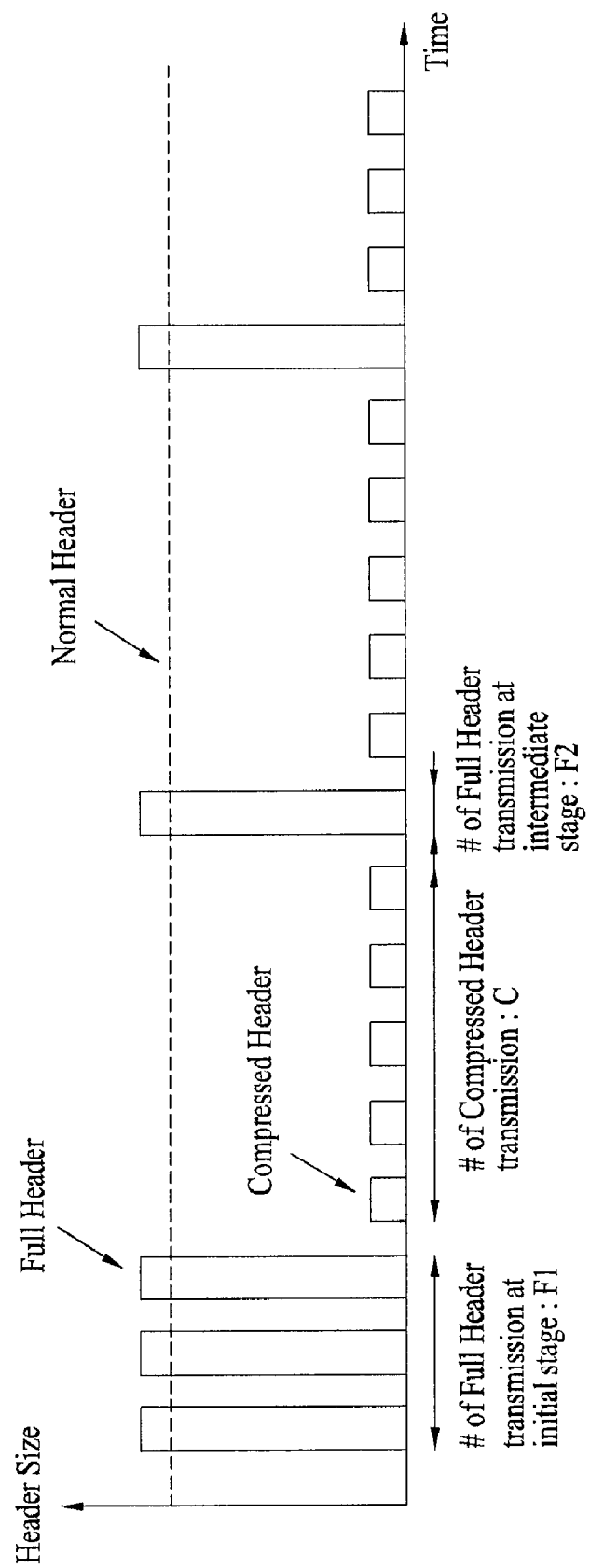
FIG. 8 illustrates change of the header size of a packet through ROHC header compression in a PDCP layer.

FIG. 8 illustrates a change of header size in a RTP/UDP/IP packet through ROHC header compression in the PDCP layer.

As shown in FIG. 8, when a packet stream is initially transmitted, a full header is transmitted to create a context since a context has not yet been created in both the compressor and the decompressor. When a certain amount of full header has been transmitted so that a context is created, a compressed header can be transmitted. However, it is necessary to transmit a full header at appropriate intervals since the context may be corrupted due to packet loss during transmission of the packet stream. Generally, the full header is a little greater than a normal header since the full header includes additional information associated with context creation.

Data Processing Method According to Embodiment of the Invention

According to an embodiment of the present invention, success or failure of header decompression can be taken into consideration during a procedure for retransmitting a data block that has not been correctly transmitted upon handover. This enables retransmission of even a data block, the header of which has failed to be decompressed, although the data block has been correctly transmitted.

To accomplish this, an embodiment of the present invention divides data blocks (compressed packets), which are generated by performing header compression on upper layer data blocks, into two types and handles the two types of data blocks in a different manner. Preferably, header compression is performed in a Packet Data Convergence Protocol (PDCP) layer of a UE or a base station depending on the direction of data transmission. In this case, the upper layer data block is a PDCP Service Data Unit (SDU) and a data block generated through header compression is a PDCP Protocol Data Unit (PDU). The upper layer data block may be any type of data block to which header compression can be applied. For example, header compression can be used when the header type of the upper layer data block is RTP/UDP/IP, UDP/IP, ESP/IP or IP. The PDCP layer can be connected to a user application.

The first type of data block among data blocks generated by performing header compression on the upper layer data block is a first data block including a full header. For example, the first data block may be a Packet Data Convergence Protocol (PDCP) Protocol Data Unit (PDU) generated from a PDU Service Data Unit (SDU). The second type of data block is a second data block which is compressed based on the first data block. For example, the second data block is a PDCP PDU generated from a PDCP SDU with a compressed header. Performing header compression based on the first data block means that header compression has been performed with reference to or using a specific information or parameter included in the first data block.

The full header has information required for header decompression as described above with reference to header compression (see FIG. 8). The full header included in the first data block includes information required for the receiving side to decompress the header of the second data block. The information required for header decompression is used to create or update a context and is essential for decompressing the compressed header. Accordingly, when the receiving side has not correctly received the first data block (i.e., when the receiving side does not contain information required for header decompression), the receiving side cannot decompress the header of the second data block. Specifically, a compressed header of an upper layer data block included in the second data block cannot be decompressed. In this case, a data block, the header of which has failed to be decompressed, is deleted.

One example of the case where header decompression has failed although transmission has been correctly performed upon handover is when the transmission of the first data block has failed although the transmission of the second data block has succeeded. In normal cases, for in-sequence delivery of PDCP PDUs, the second data block is stored in a RLC buffer until the first data block is correctly received by the receiving side. However, when handover has occurred, the second data block stored in the RLC buffer is transferred to the PDCP layer without waiting for the first data block. Thus, the header decompression of the second data block fails and the second data block is discarded during this process. In this case, the PDCP layer of the transmitting side omits transmission of the second data block during retransmission after handover since the RLC layer has notified the PDCP layer that the second data block has been correctly received by the receiving side.

The transmission of the first data block fails, for example, in the following cases. The first case is when the first data block fails to arrive at the receiving side. In this case, the transmitting side will not receive any information associated with transmission of the first data block. If the system supports Hybrid ARQ (HARQ), the transmitting side will attempt to retransmit the first data block within a predetermined number of times or less. However, if the transmission of the first data block would fail even though the retransmission, the first data block has failed to arrive at the receiving side. The second case is when an error has occurred in the first data block although the first data block has arrived at the receiving side. In this case, the receiving side will transmit a negative acknowledgement (NACK) to the receiving side. If the first data block is a PDCP PDU, the RLC layer of the transmitting side may reconstruct the PDCP PDU into one or more RLC PDUs and transmit the RLC PDUs to the receiving side (see FIG. 5). Accordingly, even if a part of the reconstructed RLC PDUs has not been correctly transmitted to the receiving side, it is determined that the relevant PDCP PDU have not been correctly received by the receiving side.

An embodiment of the present invention prevents the above-mentioned at least one second data block from being lost during a handover procedure when the first data block has not been correctly received by the receiving side. To accomplish this, the transmitting side can determine whether or not the at least one second data block is to be retransmitted according to whether or not the first data block has been correctly received by the receiving side.

For example, when the first data block has not been correctly received by the receiving side, the transmitting side may perform a procedure for retransmitting both the first data block and the at least one second data block, regardless of whether or not the at least one second data block has been correctly received by the receiving side.

Alternatively, when one or more of the second data blocks has been correctly received by the receiving side although the first data block has not been correctly received by the receiving side, the transmitting side may perform a procedure for retransmitting both the first data block and the at least one second data block, regardless of whether or not the at least one second data block has been correctly received by the receiving side.

Alternatively, when a NACK has been received for the first data block, the transmitting side may perform a procedure for retransmitting both the first data block and the at least one second data block, regardless of whether or not an ACK has been received for the at least one second data block.

Alternatively, when a NACK has been received for the first data block and an ACK has been received for one or more of the second data blocks, the transmitting side may perform a procedure for retransmitting both the first data block and the at least one second data block.

The ACK or NACK for the first data block and the at least one second data block may be received from the receiving side or may be indicated by a specific layer. This will be described later in more detail.

The procedure for retransmitting the first data block and the at least one second data block in association with handover varies depending on whether the direction of data transmission is uplink or downlink. Specifically, when handover has occurred during downlink transmission, the source eNB forwards both the first data block and the at least one second data block to the target eNB during the handover procedure. Thereafter, the target eNB retransmits the received data blocks to the UE. When handover has occurred during uplink transmission, the UE retransmits both the first data block and the at least one second data block to the target eNB after the handover. In this case, if one or more of the second data blocks have been correctly received by the receiving side, it does not matter whether the remaining data blocks have been correctly received by the receiving side.

If the first data block has been correctly received by the receiving side, only a data block(s), which has not been correctly received by the receiving side among the at least one second data block, is forwarded during the handover procedure or is transmitted after the handover.

Alternatively, when an ACK has been received for the first data block from the receiving side, only a data block(s), for which a NACK has been received from the receiving side among the at least one second data block, is forwarded during the handover procedure or is transmitted after the handover.

Whether the first data block and the at least one second data block is forwarded during the handover procedure or is transmitted after the handover is preferably determined by a specific protocol layer having information associated with header compression. For example, the specific protocol layer is a PDCP layer. Since the PDCP layer of the transmitting side performs header compression, the PDCP layer of the transmitting side can determine which data block fails in header decompression procedure by using information associated with the status of data block reception by the receiving side. Specifically, whether or not the first data block and the at least one second data block are forwarded to the target eNB during the handover procedure in association with downlink transmission can be determined by the PDCP layer of the source eNB. Whether or not the first data block and the at least one second data block are retransmitted to the target eNB after the handover procedure in association with uplink transmission can be determined by the PDCP layer of the UE.

Preferably, the status of data block reception by the receiving side is provided to the PDCP layer, which is indicated by a lower layer. Preferably, whether or not the first data block and the at least one second data block have been correctly received by the receiving side or whether a specific PDCP PDU has been positively acknowledged or negatively acknowledged is indicated by the RLC layer. In this case, a RLC status report may be used for the indication.

Reference will now be made to a more specific method for implementing the procedure described above in the system. The data processing method according to the embodiments of the present invention can be implemented in various manners and is not limited to the following example implementations.

When the first data block has not been correctly received by the receiving side, the PDCP layer of the transmitting side may consider that a second data block, which was transmitted in association with the first data block, has not been correctly received by the receiving side as well. In this case, it does not matter whether or not the second data block has been actually correctly received by the receiving side. That is, both the first data block and the relevant second data block are considered as not correctly received by the receiving side, regardless of the reception status of the second data block.

In this regard, the first data block and the second data block are associated only in a header compression method performed at the PDCP layer. Accordingly, even if the first data block has not been correctly received by the receiving side, this does not affect another kind of second data block whose header has been compressed in a different manner from that of the first block. That is, a first data block affects only the reception state of a second data block which refers to the first block.

On the other hand, when the first data block has been correctly received by the receiving side, the first data block does not affect the reception status of the second data block. For example, if a plurality of second data blocks is present and only a part of the plurality of data blocks has not been correctly received by the receiving side, only the part is retransmitted after handover. In this case, it is not necessary to retransmit the second data block that has been correctly received by the receiving side since a header thereof can be decompressed by the PDCP layer of the receiving side.

More specifically, when handover has occurred, a status report received from the receiving side can be used. The status report may be a RLC status report message which is a lower layer message below the PDCP layer. When handover has occurred, the RLC layer of the transmitting side receives a status report for each RLC PDU, which the transmitting side has transmitted, from the RLC layer of the receiving side. The RLC layer of the transmitting side finds a correctly transmitted RLC SDU (i.e., PDCP PDU) based on positively acknowledged RLC PDU information and notifies the PDCP layer of the found RLC SDU. In this case, the PDCP layer can determine whether the PDCP PDU, which has been positively acknowledged by the RLC layer, is a first data block or a second data block using information associated with header compression. Accordingly, if there is no first data block among the PDCP PDU, which has been positively acknowledged by the RLC layer or if a PDCP PDU corresponding to the first data block has been negatively acknowledged, the PDCP layer can set a PDCP PDU corresponding to a relevant second data block to be negatively acknowledged. In this manner, both a lost first data block and a relevant second data block can be retransmitted after handover.

When handover has occurred, the manner in which data to be retransmitted is handled partially varies depending on whether the data is retransmitted in uplink or downlink. For example, in the case of downlink retransmission, the data to be retransmitted should be forwarded from the source eNB to the target eNB. For the same reason as described above, if the first data block has not been correctly received by the receiving side (i.e., UE), it is considered that the relevant second data block has also not been correctly received by the receiving side. Thereafter, upper layer data blocks (i.e., PDCP SDUs) corresponding to the first data block and the second data block are forwarded from the source eNB to the target eNB. Thereafter, the target eNB starts downlink retransmission.

The embodiments of the present invention will now be described in more detail with reference to the drawings.

Figure 9:
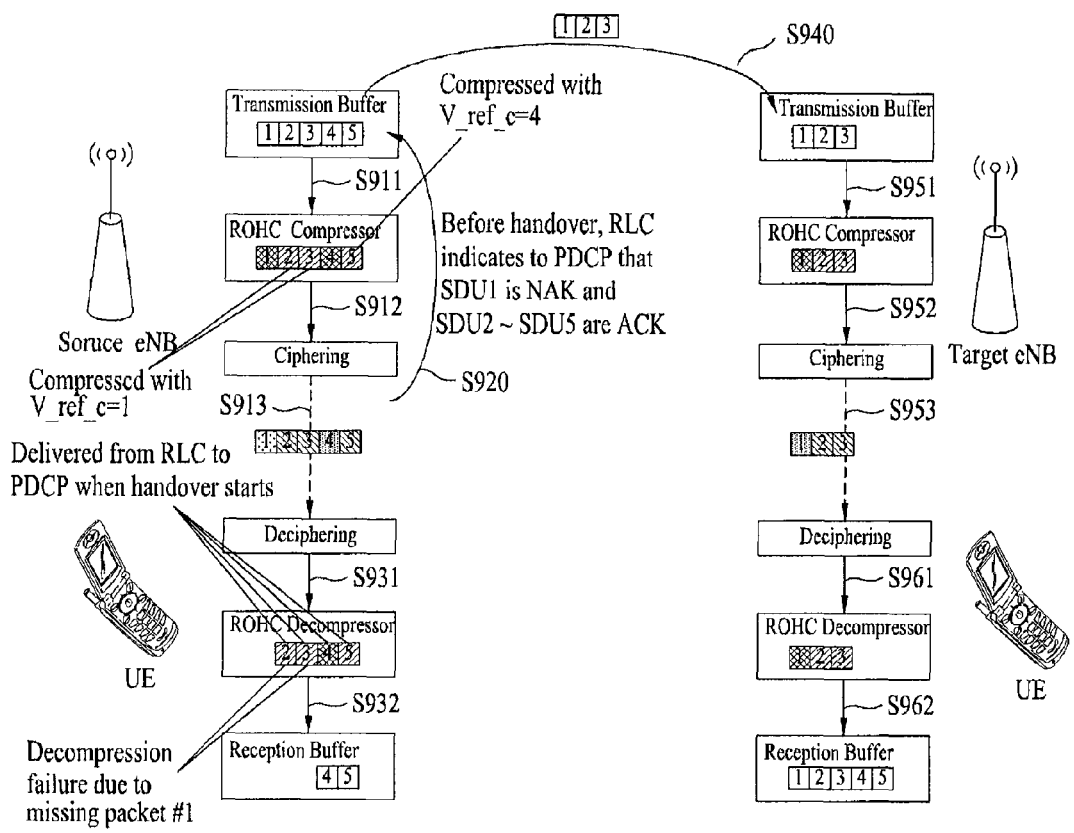
FIG. 9 illustrates a method for retransmitting PDCP SDUs when handover has occurred in downlink transmission according to an embodiment of the present invention.

FIG. 9 illustrates a method for retransmitting PDCP SDUs when handover has occurred in downlink transmission according to an embodiment of the present invention. In FIG. 9, it is assumed that up to a PDCP SDU 0 has been correctly received and positively acknowledged by the UE. Although each PDCP SDU illustrated in FIG. 9 is in fact sequentially converted into a PDCP PDU, an RLC SDU and one or more RLC PDUs as the PDCP SDU passes through each protocol layer, these will all be referred to as a "SDU" unless otherwise stated for ease of explanation.

As shown in FIG. 9, the source eNB performs header compression and ciphering on SDUs 1 to 5 and transmits them to the UE. Here, the SDUs 1 and 4 are context update packets (i.e., IR packets) and the SDUs 2, 3, and 5 are compressed packets (S911 to S913).

All SDUs other than the SDU 1 among the SDUs 1 to 5 are correctly received by the UE. The correctly received SDUs are stored in the RLC buffer since the RLC layer supports in-sequence transfer of PDCP PDUs. The RLC layer of the UE transmits a status report to the RLC layer of the source eNB to notify the RLC layer that the SDU 1 has been lost and the SDUs 2 to 5 have been correctly received (S920).

Handover occurs during retransmission of the SDU 1. The RLC layer of the UE transfers all the correctly received PDCP PDUs (i.e., SDUs 2 to 5) to the PDCP layer of the UE. A header decompressor in the PDCP layer fails to decompress headers of the SDUs 2 and 3 due to the missing context reference (i.e., SDU 1). On the other hand, headers of the SDUs 4 and 5 are successfully decompressed and the SDUs 4 and 5 are then stored in a reception buffer of the PDCP layer (S931 and S932).

The PDCP layer of the source eNB checks whether or not a header of each correctly received SDU can be successfully decompressed in the PDCP layer of the UE. The source eNB regards the SDUs 2 and 3 as having been negatively acknowledged since the context reference (SDU 1) has been lost. On the other hand, the source eNB regards the SDUs 4 and 5 as having been positively acknowledged since the context reference is present in the SDU 4.

The source eNB forwards all PDCP SDUs that have not been positively acknowledged to the target eNB. In the example of FIG. 9, the source eNB forwards the SDUs 2 and 3 together with the SDU 1 although the source eNB has been notified that the SDUs 2 and 3 have been correctly received by the UE (S940).

After handover, the target eNB retransmits the SDUs 1 to 3 to the UE (S951 to S953). Headers of the retransmitted SDUs 1 to 3 are decompressed by the UE and the SDUs are then reordered in the PDCP reception buffer and the reordered SDUs are then transferred to the upper layer (S961 and S962). Here, it should be noted that the target eNB retransmits the SDUs 2 and 3 although it has been notified that the SDUs 2 and 3 have been correctly received by the UE.

Figure 10:
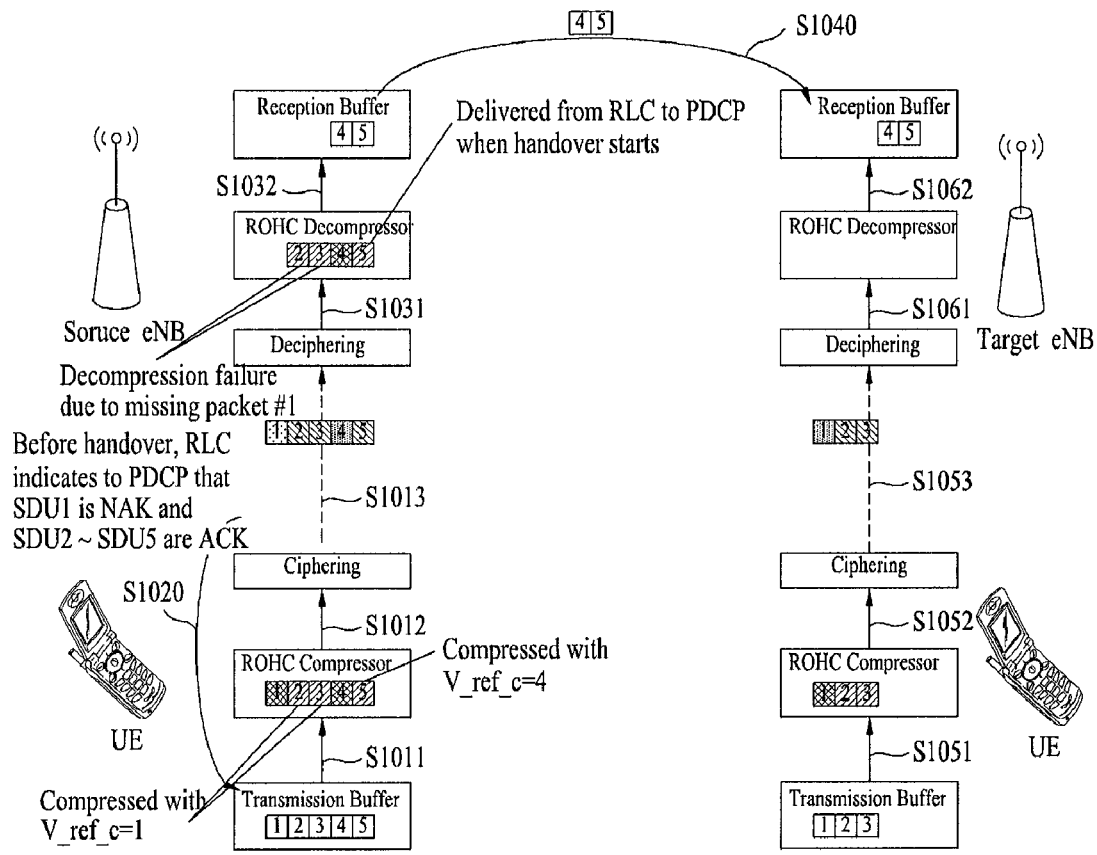
FIG. 10 illustrates a method for retransmitting PDCP SDUs when handover has occurred in uplink transmission according to another embodiment of the present invention.

FIG. 10 illustrates a method for retransmitting PDCP SDUs when handover has occurred in uplink transmission according to another embodiment of the present invention. Situations and assumptions applied to the method of FIG. 10 are similar to those of the method of FIG. 9 applied to downlink transmission, with the only difference being the RB direction. The following are detailed processes of the method of FIG. 10.

In FIG. 10, it is assumed that up to a PDCP SDU 0 has been correctly received and positively acknowledged by the source eNB. The UE transmits SDUs 1 to 5 to the source eNB. Here, the SDUs 1 and 4 are context update packets (i.e., IR packets) and the SDUs 2, 3, and 5 are compressed packets (S1011 to S1013).

All SDUs other than the SDU 1 among the SDUs 1 to 5 are correctly received by the source eNB. The correctly received SDUs are stored in the RLC buffer since the RLC layer supports in-sequence transfer of PDCP PDUs. The RLC layer of the source eNB transmits a status report to the RLC layer of the UE to notify the RLC layer that the SDU 1 has been lost and the SDUs 2 to 5 have been correctly received (S1020).

Handover occurs during retransmission of the SDU 1. The RLC layer of the source eNB transfers all the correctly received PDCP PDUs (i.e., SDUs 2 to 5) to the PDCP layer of the source eNB. A header decompressor in the PDCP layer fails to decompress headers of the SDUs 2 and 3 due to the missing context reference (i.e., SDU 1). On the other hand, headers of the SDUs 4 and 5 are successfully decompressed and the SDUs 4 and 5 are then stored in a reception buffer of the PDCP layer (S1031 and S1032).

The source eNB forwards all PDCP SDUs in the reception buffer to the target eNB. In the example of FIG. 10, the source eNB forwards the SDUs 4 and 5 to the target eNB (S1040).

The PDCP layer of the UE checks whether or not a header of each correctly received SDU can be successfully decompressed in the PDCP layer of the source eNB. The UE regards the SDUs 2 and 3 as having been negatively acknowledged since the context reference (SDU 1) has been lost. Accordingly, the UE does not delete both the SDU 1 and the SDUs 2 and 3 from the transmission buffer. However, the UE regards the SDUs 4 and 5 as having been positively acknowledged since the context reference is present in the SDU 4. Thus, the UE can delete the SDUs 4 and 5 from the transmission buffer.

After handover, the UE retransmits the SDUs 1 to 3 to the target eNB (S1051 to S1053). Headers of the retransmitted SDUs 1 to 3 are decompressed by the target eNB and the SDUs are then reordered in the PDCP reception buffer and the reordered SDUs are then transferred to the upper layer (S1061 and S1062). Here, it should be noted that the UE retransmits the SDUs 2 and 3 to the target eNB although it has been notified that the SDUs 2 and 3 have been correctly received by the source eNB.

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The above embodiments of the present invention have been described focusing mainly on the data communication relationship between a UE (or terminal) and a Base Station (BS). Specific operations which have been described as being performed by the BS may also be performed by upper nodes as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", "mobile station (MS)", or "mobile subscriber station (MSS)".

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so that it can be executed by a processor. The memory unit may be located inside or outside the processor and can communicate data with the processor through a variety of known means.

INDUSTRIAL APPLICABILITY

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

What is claimed is:

1. A method of processing data by a source base station in a mobile communication system, the method comprising:
   transmitting a first data block, to a user equipment, the first data block including a full header;
   transmitting, to the user equipment, at least one second data block on which header compression was performed based on the first data block; and
   forwarding the first data block and the at least one second data block to a target base station during a handover procedure, in order for the target base station to re-transmit the first data block and the at least one second data block to the user equipment, when the first data block was not correctly received by the user equipment and the at least one second data block was correctly received by the user equipment,
   wherein the forwarding the first data block and the at least one second data block to the target base station is determined by a Packet Data Convergence Protocol (PDCP) layer checking a status of at least one second block received from the user equipment, and
   wherein the status of at least one second block is set to indicate negative acknowledgement by the PDCP layer, when the PDCP layer receives information indicating the first data block was not correctly received by the user equipment.

2. The method of claim 1, wherein the full header comprises information required for the header decompression of the at least one second data block.

3. The method of claim 2, wherein the information required for the header decompression includes information for creating or updating a context.

4. The method of claim 1, wherein a lower layer indicates to the PDCP layer whether or not the first data block and the at least one second data block were correctly received by the user equipment.

5. A method of transmitting and receiving data by a user equipment in a mobile communication system, the method comprising:
   receiving, from a source base station, a first data block including a full header;
   receiving, from the source base station, at least one second data block on which header compression was performed based on the first data block;
   transmitting, by the user equipment, a negative acknowledgement for the first data block and a positive acknowledgement for the at least one second data block to the source base station; and
   re-receiving the first data block and the at least one second data block from a target base station after a handover procedure, wherein the at least one second data block, re-received by the user equipment, is determined by a Packet Data Convergence Protocol (PDCP) layer of the source base station, and wherein the acknowledgement for the at least one second data block, to the source base station, is set to indicate negatively acknowledged by the PDCP layer of the source base station.

6. The method of claim 5, wherein the full header comprises information required for the header decompression of the at least one second data block.

7. The method of claim 6, wherein the information required for the header decompression includes information for creating or updating a context.

* * * * *